Patented Sept. 26, 1933

1,927,940

UNITED STATES PATENT OFFICE 1,927,940

IRON-CONTAINING ALLOY FOR PERMANENT MAGNETS

Werner Köster, Dortmund, Germany, assignor to firm Vereinigte Stahlwerke Aktiengesellschaft, Dusseldorf, Germany No Drawing. Application May 12, 1931, Serial No. 536,951, and in Germany May 12, 1930

4 Claims. (Cl. 175—21)

This invention relates to alloys for permanent magnets.

In the production of permanent magnets and also magnets such as loud-speaker magnets which are additionally excited in operation, steels with a substantial carbon content are almost exclusively employed.

In order to be able to assume the desired magnetic values, these steels must be hardened by quenching. In consequence of their great mechanical hardness they are however brittle and no longer workable. On the other hand however it is frequently desirable, in order to facilitate the practical production and for the development of new forms of magnets, if the magnet could be worked in a state in which it has already acquired the desired magnetic properties.

According to the invention this object is attained by selecting a ferrous alloy which is poor in or practically free from carbon and which is of such a composition that even after quenching from high temperatures it still has a suitable degree of toughness. Preferred alloys of such a nature are for example, iron-cobalt-tungsten-alloys containing from 2% to 80% cobalt and from 2% to 35% of tungsten, which are quenched from a temperature lying from 800° C and the melting point. In this state the alloys can be mechanically worked whilst possessing a high magnetic hardness.

Example

An alloy containing 30% of cobalt, 15% of tungsten, 0.08% of carbon, 0.1% of silicon, 0.6% of manganese, remainder iron (sulphur and phosphorus being present as impurities) was quenched in oil from 1100° C. The coercive force then amounted to 100 to 110 gauss the remanence 9000 to 10,000 gauss. In this state the alloy could be easily worked by turning, planing, boring and the like and could even be worked in the cold.

The tungsten content of the magnetic alloy may be wholly or partly replaced by one or more of the elements, chromium, manganese, molybdenum, vanadium, beryllium, aluminium, silicon or nickel.

I claim:—

1. A process of manufacturing permanent magnets of high toughness, comprising forming the magnets from an alloy on the basis of iron and cobalt, with only traces of carbon not exceeding about 0.15%, and containing besides iron and cobalt at least one further alloy element in amounts from 2 to 35%, and heating the magnets formed to a temperature above 800° C. and quenching them from this temperature.

2. A process of manufacturing permanent magnets of high toughness, comprising forming the magnets from an alloy on the basis of iron and cobalt, the cobalt content amounting to between 2 and 80%, with traces of carbon not exceeding about 0.15% and containing besides iron and cobalt at least one further alloying element in amounts from 2 to 35%, and heating the magnets formed to a temperature above 800° C. and quenching them from this temperature.

3. A process of manufacturing permanent magnets of high toughness, comprising forming the magnets from an alloy on the basis of iron and cobalt, the cobalt content of the alloy amounting to between 2 and 80%, with traces of carbon not exceeding about 0.15% and containing besides iron and cobalt at least one further alloying element selected from the following group: tungsten, molybdenum, chromium, manganese, aluminium, silicon, in amounts from 2 to 35%, and heating the magnets formed from such alloy to a temperature above 800° C. and quenching them from this temperature.

4. Permanent magnets consisting of an alloy on the basis of iron and cobalt, the cobalt content amounting to between 2 and 80%, with traces of carbon not exceeding about 0.15%, said alloy containing besides iron and cobalt at least one further alloying element selected from the following group consisting of tungsten, molybdenum, chromium, manganese, aluminium and silicon in amounts from 2 to 35%, which has been subjected to a heating and quenching treatment.

WERNER KÖSTER.